United States Patent [19]

Fairbairn

[11] 3,947,654

[45] Mar. 30, 1976

[54] METHOD OF GENERATING LASER-RADIO BEAM

[75] Inventor: Thomas E. Fairbairn, Westland, Mich.

[73] Assignee: Sirius Corporation, Toledo, Ohio

[22] Filed: Dec. 12, 1974

[21] Appl. No.: 531,895

Related U.S. Application Data

[62] Division of Ser. No. 409,167, Oct. 24, 1973, Pat. No. 3,872,279.

[52] U.S. Cl. ................ 219/121 LM; 219/121 P
[51] Int. Cl.² ........................................ B23K 27/00
[58] Field of Search ........ 219/121 P, 121 LM:121 L, 219/121 EB, 121 EM, 76; 313/231.3; 315/111.1; 331/94.5 R

[56] References Cited
UNITED STATES PATENTS

| | | | |
|---|---|---|---|
| 3,309,564 | 3/1967 | Poulsen | 219/121 P X |
| 3,324,277 | 6/1967 | Herring, Jr. | 219/121 P X |
| 3,347,698 | 10/1967 | Ingham, Jr. | 219/121 P X |
| 3,648,015 | 3/1972 | Fairbairn | 219/121 P |
| 3,719,829 | 3/1973 | Vaill | 331/94.5 R |
| 3,723,246 | 3/1973 | Lubin | 331/94.5 A X |

Primary Examiner—J. V. Truhe
Assistant Examiner—G. R. Peterson
Attorney, Agent, or Firm—Cullen, Settle, Sloman & Cantor

[57] ABSTRACT

A laser-radio frequency system for generating a high temperature beam and for directing and modulating the combined beam at a workpiece or target. The system includes a hollow circular electrode mounted within a circular nozzle and spaced apart from the nozzle to define an annular gap. A radio frequency generator having a hollow metal coil as its tank coil is connected to the nozzle and a pressurized inert gas is fed through the tank coil into the nozzle. When the generator is activated, a coherent R.F. electron stream is emitted from the electrode and the inert gas flows along the annular gap to sheath and focus the stream into an energy beam directed toward the workpiece. A laser generator provides a laser beam through the hollow portion of the electrode which is reflected and focused onto the workpiece; therefore an algebraic summation of both electromagnetic energies is obtained at the workpiece in the non-oxidizing atmosphere. The radio frequency tank coil may be connected to a source of powder for spraying a coating on the workpiece.

2 Claims, 4 Drawing Figures

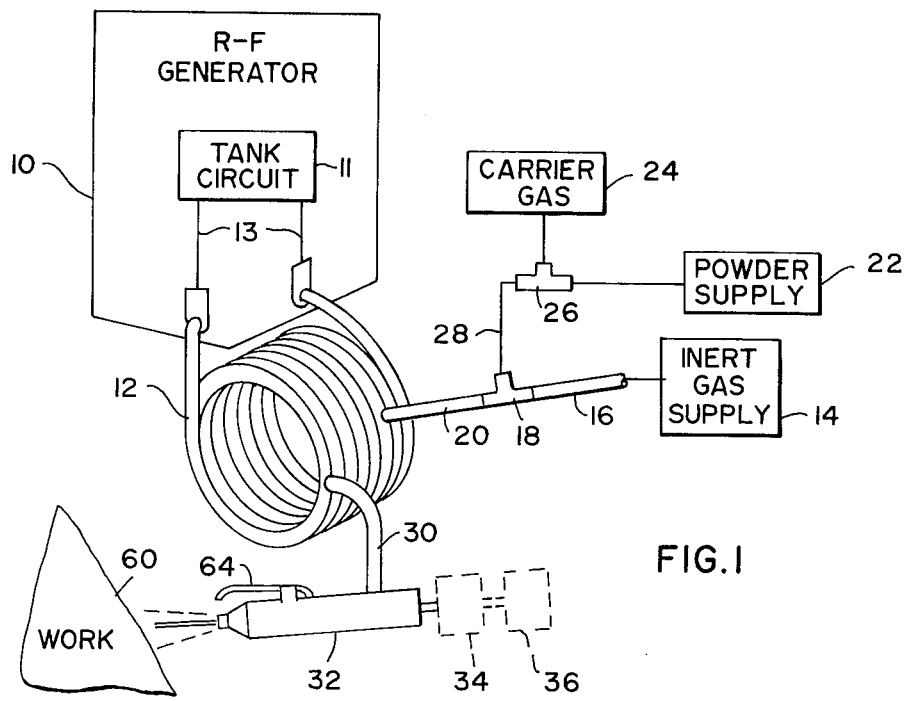
FIG.1
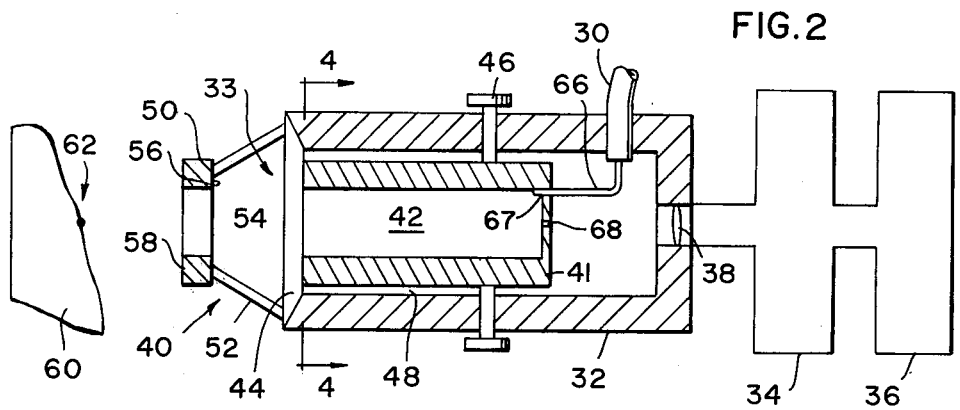
FIG.2
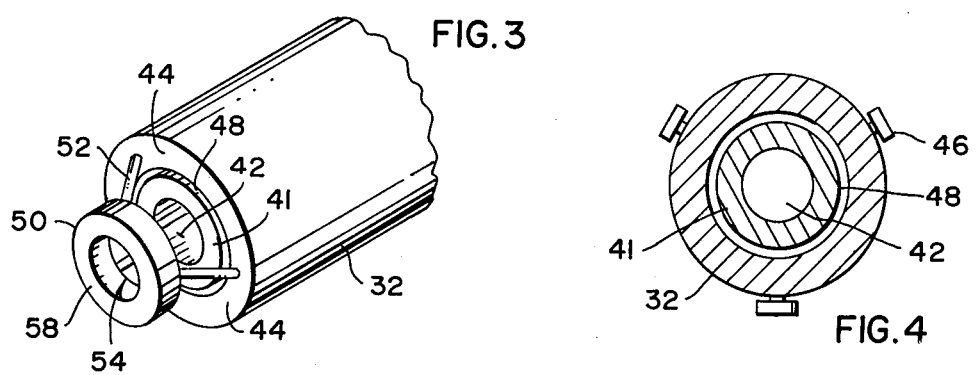
FIG.3
FIG.4

METHOD OF GENERATING LASER-RADIO BEAM

This is a division of application Ser. No. 409,167, filed Oct. 24, 1973 now U.S. Pat. No. 3,872,279.

BACKGROUND OF THE INVENTION

This invention relates generally to electronic flames or radio frequency (R.F.) energy beams in combination with laser beams to provide an energy system for communications, for heating and for otherwise operating on workpieces. Much of the background of the R.F. energy beam portion of this invention may be found in the U.S. Pat. No. 3,648,015, issued to Thomas E. Fairbairn on Mar. 7, 1972.

The R.F. energy portion of the beam, which is generally known, is generated by a conventional radio frequency generator having a tank coil in its output circuit. The tank coil is a hollow metal tube into which inert gas is introduced under pressure. The output of the tank coil is coupled through a nozzle having an electrode mounted therein, and upon application of power to the radio frequency generator, an R.F. electron energy beam is emitted from the tip of the electrode and this beam is sheathed and focused by the inert gas.

Unsuccessful attempts have been made to treat certain metals with lasers prior to my invention. For example, it is not yet possible to perform deep penetration welding of aluminum with only a laser, because aluminum has a mirror like finish, and lasers have a high index for reflection off of aluminum. Furthermore, the present laser welding units, to weld other metals, require lasers generating in excess of 10 kilowatts of power at a cost of about $50 per watt, or a total cost in excess of $500,000.

The present invention contemplates a method and apparatus for providing a composite laser-radio frequency energy beam system. Prior to my conception of this invention, it was not known that the laser beam could be utilized in conjunction with an R.F. plasma type energy beam.

The present invention includes a radio frequency energy beam generator such as a torch, modified over the torch described in my U.S. Pat. No. 3,648,015, and combined with a laser generator. The torch of the present system includes a nozzle having a hollow electrode mounted therein. The laser beam is focused through the hollow portion of the electrode, without hitting the inner surface of the electrode, along with a low pressure gas. The laser is focused on a workpiece such as by an adjustable Cassegranian reflector. The energy beam generator is generally set forth in my prior patent, and upon energization of the radio frequency generator and introduction of an inert gas, the hollow electrode emits the coherent R.F. plasma energy beam. The R.F. plasma energy beam is sheathed or surrounded by an annular ring of inert gas which limits the scattering of the beam.

It is an object of the present invention to provide an improved oxidation resistant energy system which has a high energy level and heats work much faster and more controllably in a unit area of a target than prior art systems. Because of these features, the workpiece may be moved more rapidly through the beam for deep penetration fusion welds.

It is another object of the present invention to provide an energy system which permits point focusing of an intense portion of the summation of both energy beams for rapid traversing of the work, regardless of surface reflectivity of the target.

The present invention provides for a continuous beam which requires less peak power for deep penetration welding of metals including aluminum, and ceramics at a cost reduction of 10 times that of present lasers.

BRIEF DESCRIPTION OF THE DRAWINGS

The foregoing objects of the present invention, together with other objects and advantages which may be attained by its use, will become more apparent upon reading the following detailed description taken in conjunction with the drawings.

In the drawings, wherein like reference numerals identify corresponding parts:

FIG. 1 is a diagrammatic illustration of the laser-R.F. energy beam torch of the present invention;

FIG. 2 is an enlarged, partly sectional illustration of the nozzle and electrode of the torch of the present invention;

FIG. 3 is an enlarged perspective partial illustration of the nozzle and electrode of the torch of FIG. 2; and FIG. 4 is a side elevation of the electrode as seen in the direction of the arrows 4—4 of FIG. 2.

DETAILED DESCRIPTION OF THE INVENTION

The laser beam-radio frequency energy beam system of the present invention includes a radio frequency generator 10 having a conventional output tank circuit 11 and a tank coil 12. The choice of the particular radio frequency generator may be made by those killed in the art as long as a coherent single frequency R.F. sine wave is the output. An examplary circuit is shown in my U.S. Pat. No. 3,648,015 which is hereby incorporated by reference. The tank coil is a hollow copper tubing both ends of which are electrically and mechanically connected to the tank circuit as at 13.

In addition to the electrical input to the tank coil 12 supplied by the R.F. generator 10, there is a pressurized fluid input provided from a fluid supply 14. The fluid may be water or may be a gaseous media such as oxygen, propane or hydrogen, or other inert gas. An inert gas such as air or helium is preferred. A fluid path is defined from a tube 16 through a T fitting 18 and a supply tube 20 to a low voltage, high current point on the tank coil 12. Inert gas under very low pressure is introduced at a low voltage point of the tank coil to prevent ionization of the gas with its resultant effect upon the fittings and the tank coil such as shorting, melting and the like.

A powder material or other aggregate may also be introduced into the tank coil for spraying onto a workpiece, from a supply of powder 22. The powder or aggregate supply 22, together with a carrier gas 24, are supplied as inputs to a second T fitting 26. The output of this T-fitting goes through a tube 28 to the T-fitting 18. Thus, the powder supply, which is optional, is also introduced into a low voltage, high current point of the tank coil 12 and is conveyed in a smaller tube, not shown, within the tube or tank coil 12.

The output from the tank coil is taken at a high voltage, low current point through a tube 30 to an electrically conductive nozzle 32. This provides the radio frequency input to the nozzle. focusing The laser input is provided by a pair of Q-switched laser amplifiers, such as Sylvania's 4A8-$CO_2$ type, including a first amplifier 34 and a second amplifier 36. These are high power amplifiers which are aligned, as is conventional, to provide a laser beam which is introduced into the rear of the nozzle 32, such as through a focussing lens 38.

The hollow nozzle 32, which has an outlet orifice 33, includes an electrode 40 having a main body 41 with a hollow center 42. The nozzle has a curved front face which may be highly polished to serve as a mirror as at 44. The electrode is mounted within and electrically connected to the nozzle by three threaded screws 46 spaced 120° apart and projecting radially inwardly towards the hollow center of the electrode. The three threaded screws 46 provide a force fit on the outer surface of the electrode and the space between the electrode and the nozzle defines an annular air gap 48. The length of the electrode may extend past the nozzle orifice and may be adjusted by first releasing the screws 46 to focus the elctron beam.

The electrode 40 also includes an extension or ring 50 which is attached to the main body 41 of the electrode by a plurality of electrically conductive struts or supports 52. The extension 50 also has a hollow center 54 and has a rear surface mirror 56 facing the main body 41 and a front surface or electrode tip 58.

A workpiece 60 is positioned a distance away from the electrode tip 58 to receive both the laser beam and the electron plasma beam.

Upon energization of the radio frequency generator 10 and upon application of the inert gas, the coherent R.F. electron-plasma energy beam is generated. Although the nozzle 32 and the electrode tip 58 remain cool, the tip 58 emits a high frequency coherent electron-plasma energy stream and the inert gas which passes through the annular air gap 48 between the electrode body 41 and the nozzle 32 forms an annular sheath which limits the outward scattering of the stream and directs and focuses it into a beam which annular sheath flows around the extension 50 and impinges onto the workpiece. The energy beam goes through the hollow center 54 of the extension and is emitted from the tip 58. The R.F. beam will take a relatively long time to melt the workpiece (one to three) seconds compared to a focused laser beam.

To provide an improved energy absorption, the laser beam is combined with the R.F. energy beam. The laser beam output of the Q-switched laser amplifiers proceeds on a straight path through the lens 38, continues through an opening 68 in the end of the body 41, through the hollow center 42 of the electrode 40 and is then reflected back off the rear face 56 of the electrode extension. The reflected laser beam is again reflected off the curved face 44 of the nozzle 32 onto the workpiece 60. Both the rear 56 of the extension 50 and the curved face 44 are highly polished to reflect the laser beam. Thus they operate as a Cassegranian reflector system and still allow the inert gas to pass through the hole or aperture 54.

The front face or tip 58 of the electrode extension 50 is typically molybdenum, tungsten or platinum.

The struts 52 are threaded into the curved face 44 so that the electrode extension 50 may be moved axially toward or away from the workpiece to adjust the focal point 62 where the laser beam impinges upon the workpiece.

The laser beam provides a high energy beam which serves as an energy guide for the R.F. energy beam which, in turn, is readily absorbed by the workpiece. The combined effect of the laser beam and radio frequency energy beam is similar to the operation of a drill bit with the laser beam operating similar to a feed screw to "penetrate" or initiate melting of the workpiece and with the R.F. electron being operated as the "cut-lip" of the blade to melt additional material.

If it is desired to spray a powder or aggregate fusing or coating onto the workpiece, this may be accomplished by activating the powder or aggregate supply 22 and its associated carrier gas 24 as set forth in the aforementioned patent. The powder follows a second tube which is wound within the tank coil 12 and which emerges from the tube 30 as a tube 64 external to the nozzle (FIG. 1) or as a tube 66 internal to the nozzle (FIG. 2), through a window or aperture 67. Optionally, the inert carrier gas may always be "on" with the aggregate 22 introduced through fitting 26 when desired. It is preferred to have gas "on" through inner and outer tubes 66 and 30 whether or not powder is being sprayed, to provide for laminar flow of the gas and improved beam control.

The use of the laser beam serves to heat, by ionization and other means, the inert gas as it emerges from ring electrode 50 during operation and thus the gas reaches the surface of the workpiece at higher temperature and higher energy peaks than in the prior art.

The helium, air, or inert gas emerging from the hollow center 42 of the electrode and passing through the hole 54 in the extension 50 conducts the R.F. coherent sine wave energy to the workpiece. The helium is ionized partially by the laser beam as it travel through the hollow electrode. This partially ionized gas stream does not fully ionize until it emerges through the electrode extension 50 which is where the R.F. energy is supplied to fully generate the R.F. energy beam from the electrode tip 58.

The R.F. energy E, will also modulate the laser energy $E_2$ (carrier). Both waves are electromagnetic and the algebraic sum and difference for energy apply. Thus, using Planck's constant, $E_T=hv$, where $V=$ frequency, and $E_T = E_1 + E_2$ (algebraic).

It should be appreciated that the purpose of the lens 38 is to focus the laser beam and prevent the laser from damaging the inside walls of the hollow electrode body 41. Thus this lens is not necessary and only a window is needed if the amplifier is provided with a suitable focusing mechanism.

Similarly, the electrode extension or ring 50 of the Cassegranian type mirror or reflector system may be a hollow mirror or lens with a tungsten facing to define the electrode tip 58.

Thus the foregoing is a description of one embodiment of the present invention and should not be construed in a limiting sense but only as describing the underlying concepts involved. The invention should be limited only by the scope of the following claims.

What is claimed is:

1. In a method for generating a high temperature coherent electromagnetic beam by generating a single frequency sine wave signal in a hollow electrically conductive tubular tank coil of a radio-frequency generator; injecting an inert gas into a maximum current-low voltage point of said tank coil; conveying said inert gas through said coil to an exit port located at a maximum voltage low-current point of said coil; conveying said inert gas from said exit port through a hollow electrically conductive outlet tube to a nozzle having an outlet orifice; transmitting said single frequency sine wave signal from said maximum voltage low current point of said coil around a hollow electrode means centrally located in said nozzle orifice; the improvement characterized by: conveying a laser beam through said outlet nozzle and through the hollow portion of said electrode means, together with a low pressure gas stream; and reflecting said laser beam from the hollow portion of said electrode means onto said workpiece and focusing the laser beam thereon, while allowing said low pressure gas stream to continue directly toward said workpiece; whereby said inert gas forms an annular sheath which surrounds and focuses the high temperature stream emitted from said electrode means and nozzle orifice into a beam.

2. The invention of claim 1 and further including injecting a finely divided heat fusible material into a maximum current zero voltage point of tank coil; and conveying said material through said tank coil and out through said exit port to said nozzle orifice; whereby said material enters the coherent electromagnetic beam emitted from said nozzle, said material being thus sprayable onto workpieces to be deposited and fused thereon as a coating.

* * * * *